United States Patent
Hartmann

[11] Patent Number: 6,083,390
[45] Date of Patent: Jul. 4, 2000

[54] SYSTEM FOR MEMBRANE FILTRATION IN A CROSS STREAM PROCESS

[75] Inventor: Eduard Hartmann, Schneisingen, Switzerland

[73] Assignee: Bucher-Guyer AG, Niederweningen, Switzerland

[21] Appl. No.: 09/077,112

[22] PCT Filed: Sep. 17, 1997

[86] PCT No.: PCT/CH97/00349

§ 371 Date: Sep. 10, 1998

§ 102(e) Date: Sep. 10, 1998

[87] PCT Pub. No.: WO98/13130

PCT Pub. Date: Apr. 2, 1998

[30] Foreign Application Priority Data

Sep. 26, 1996 [CH] Switzerland ............... 2370/96

[51] Int. Cl.[7] .............. B01D 63/06; B01D 69/04
[52] U.S. Cl. .............. 210/232; 210/321.79; 210/321.88; 210/323.2; 210/541; 96/8
[58] Field of Search ............... 210/232, 332.1, 210/321.6, 321.79, 321.82, 321.88, 321.89, 339, 997.01, 323.2, 321.73, 541; 96/8, 9

[56] References Cited

U.S. PATENT DOCUMENTS

| | | | |
|---|---|---|---|
| 4,016,078 | 4/1977 | Clark | 210/94 |
| 4,276,176 | 6/1981 | Shorr | 210/637 |
| 4,732,676 | 3/1988 | Molner et al. | 210/323.2 |
| 5,141,640 | 8/1992 | Sasajima et al. | 210/321.79 |
| 5,194,149 | 3/1993 | Selbie et al. | 210/232 |
| 5,470,469 | 11/1995 | Eckman | 210/321.8 |

FOREIGN PATENT DOCUMENTS

| | | |
|---|---|---|
| 43 12 130 | 10/1994 | Germany . |
| 91/16124 | 10/1991 | WIPO . |
| 92/10279 | 6/1992 | WIPO . |
| 96/41676 | 12/1996 | WIPO . |

*Primary Examiner*—Joseph W. Drodge
*Attorney, Agent, or Firm*—Burns, Doane, Swecker & Mathis

[57] ABSTRACT

The system includes a number of membrane modules (1–8), each including one membrane tube or a bundle of a plurality of membrane tubes, whose walls have the function of separating membranes, as well as a tubular module housing for receiving the membrane tubes. Each membrane tube (1–8) has one connecting flange (20, 21) each for delivering and removing the retentate, as well as four further laterally disposed connecting flanges (22–25) for removing the permeate. These connecting flanges (22–25) retain the membrane modules (1–8) in self-supporting fashion in their group.

19 Claims, 10 Drawing Sheets

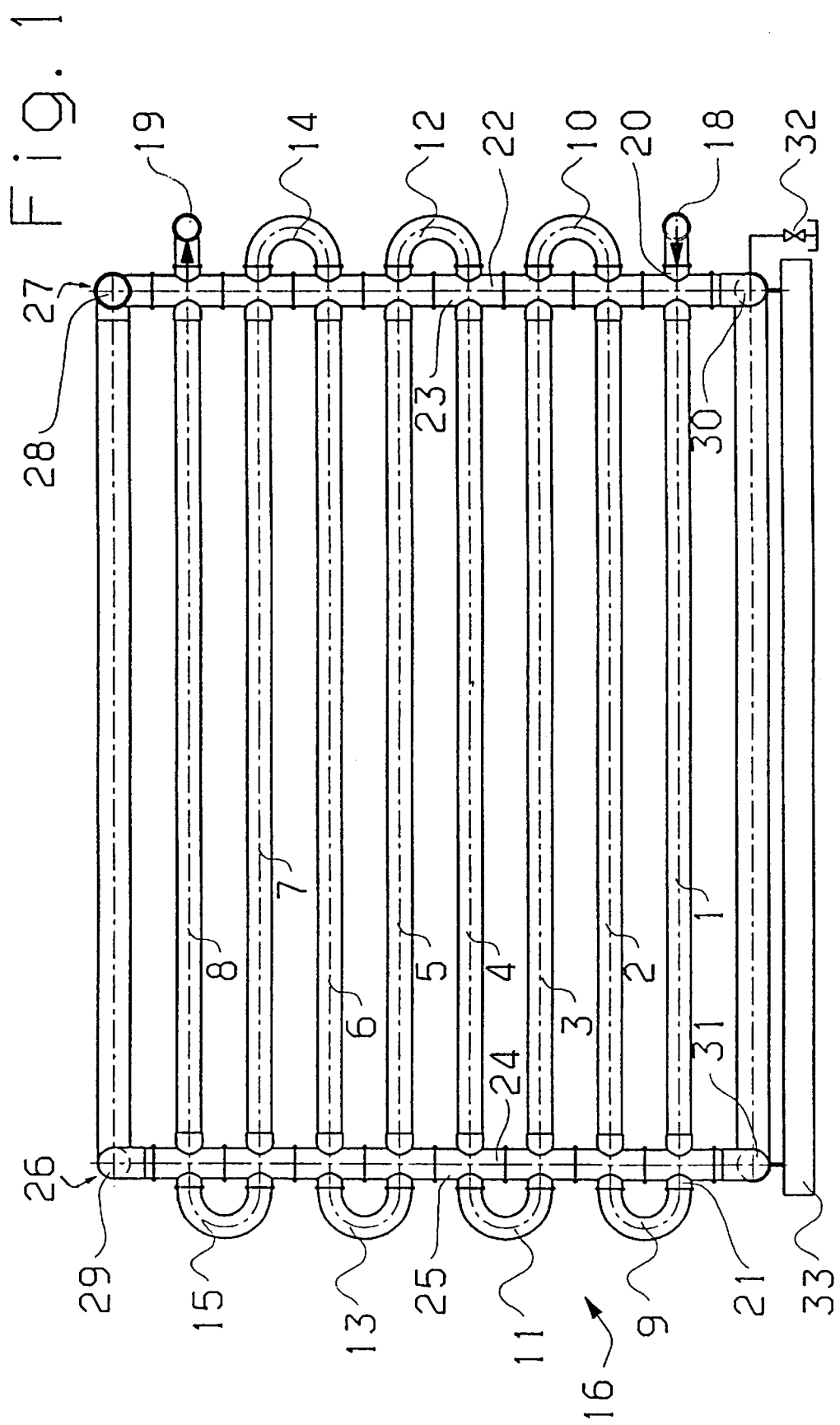

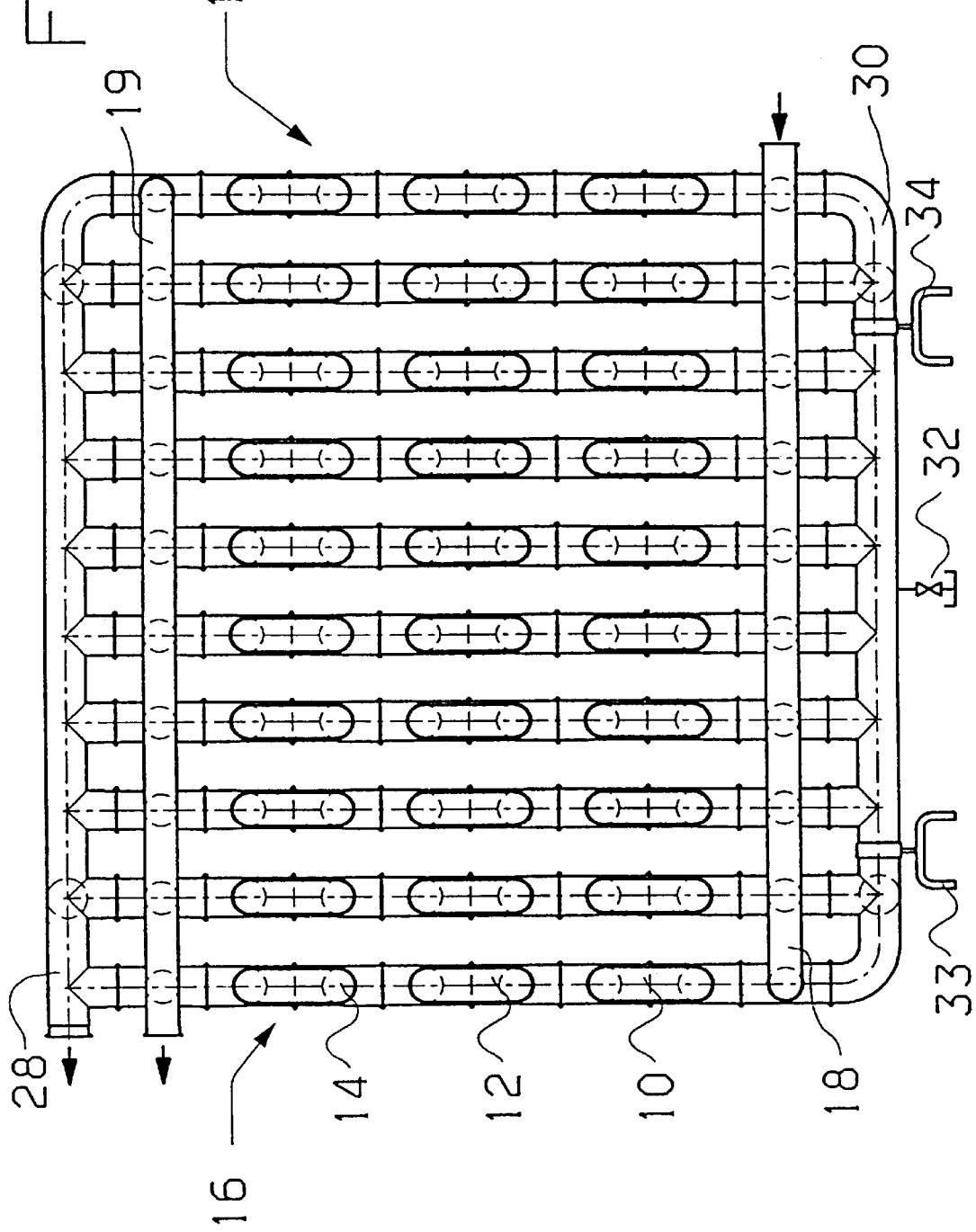

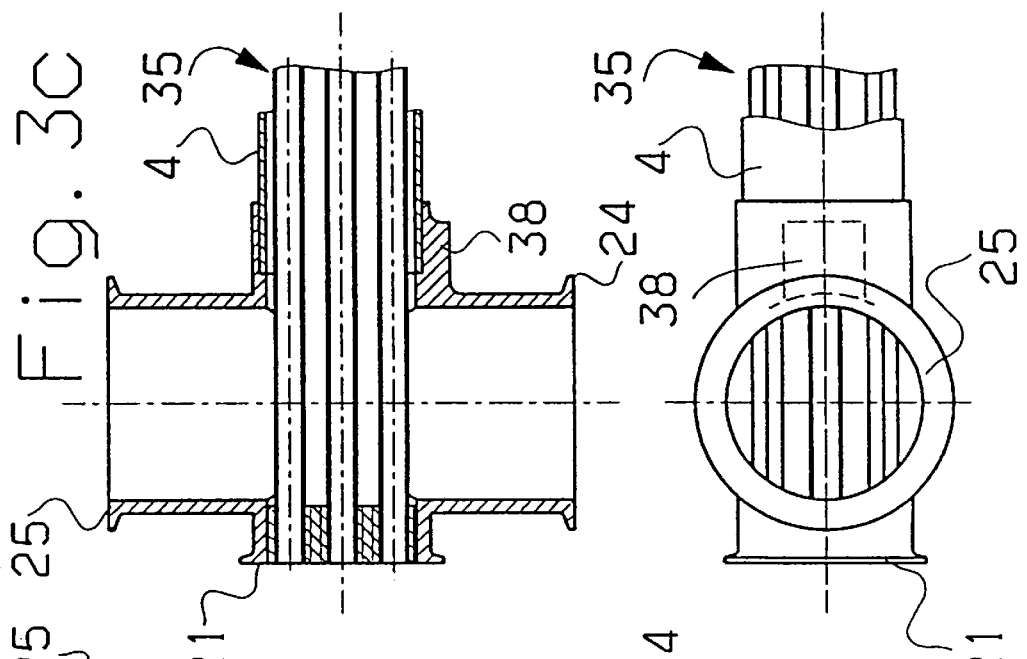
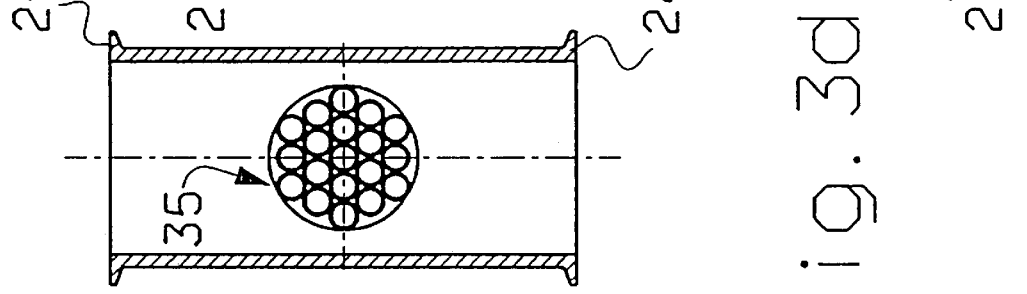
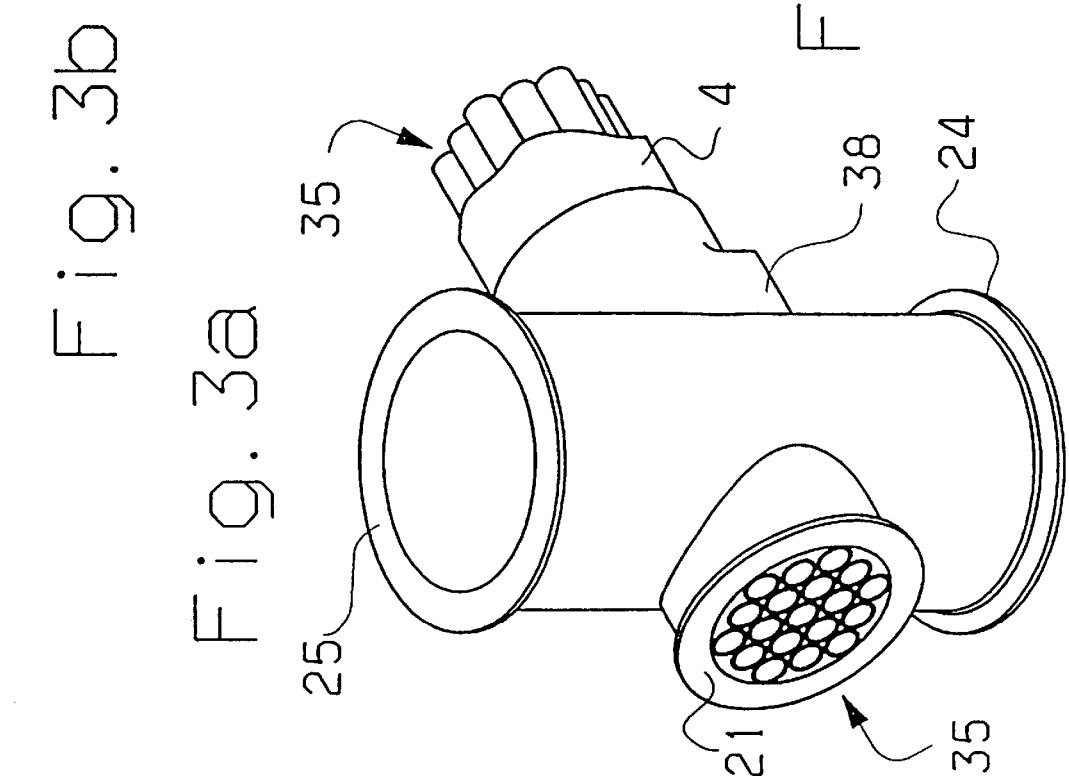

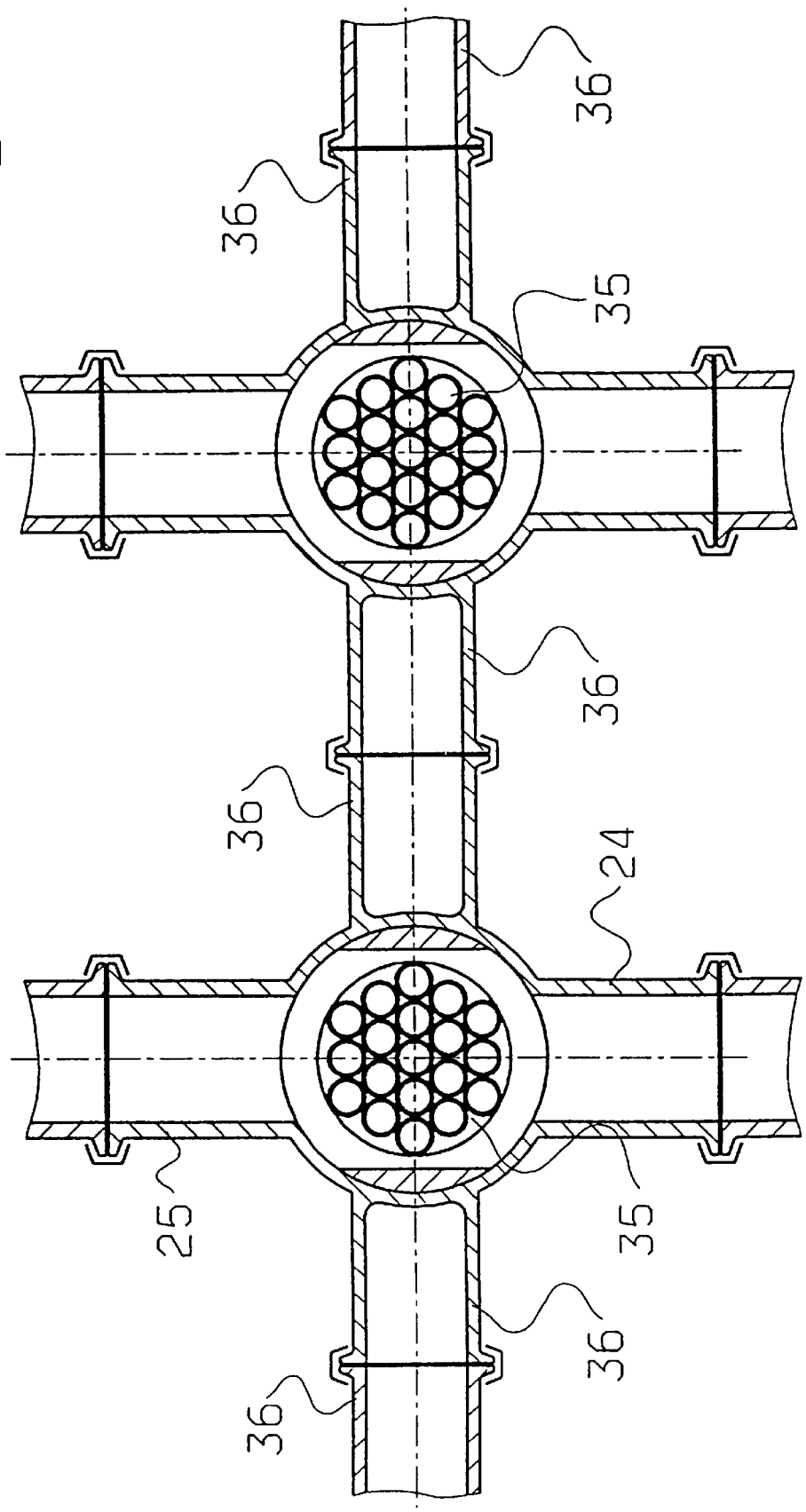

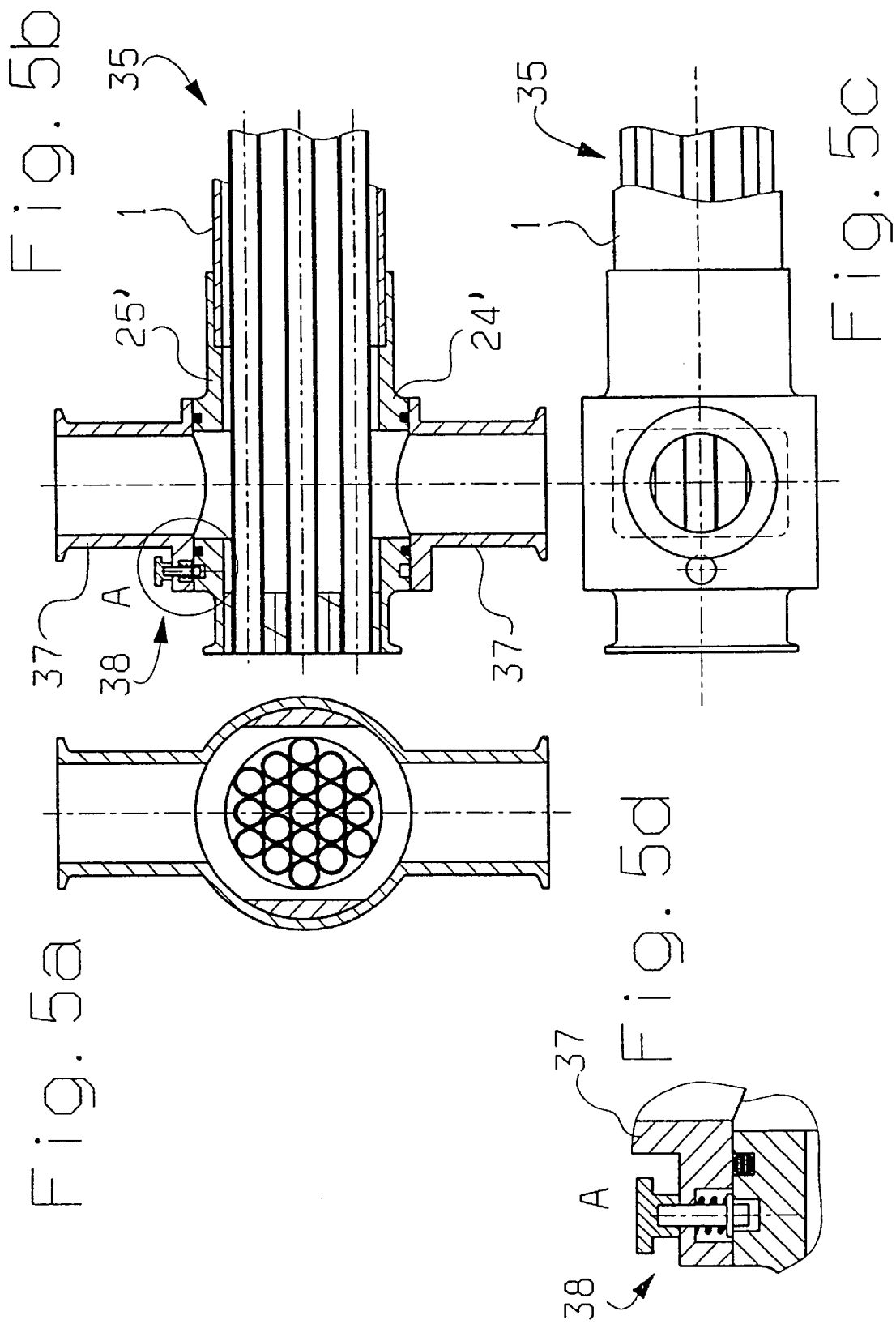

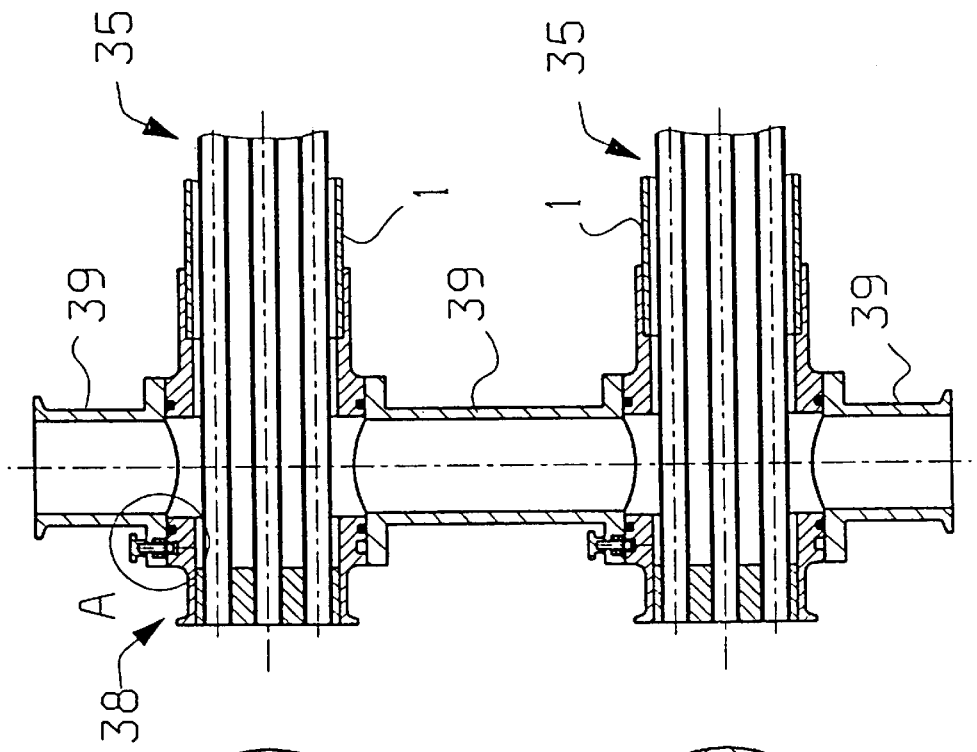
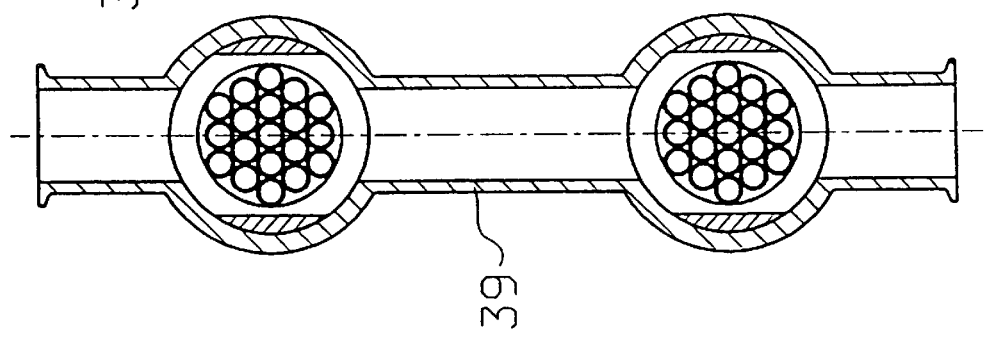
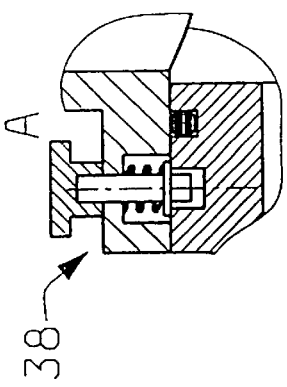

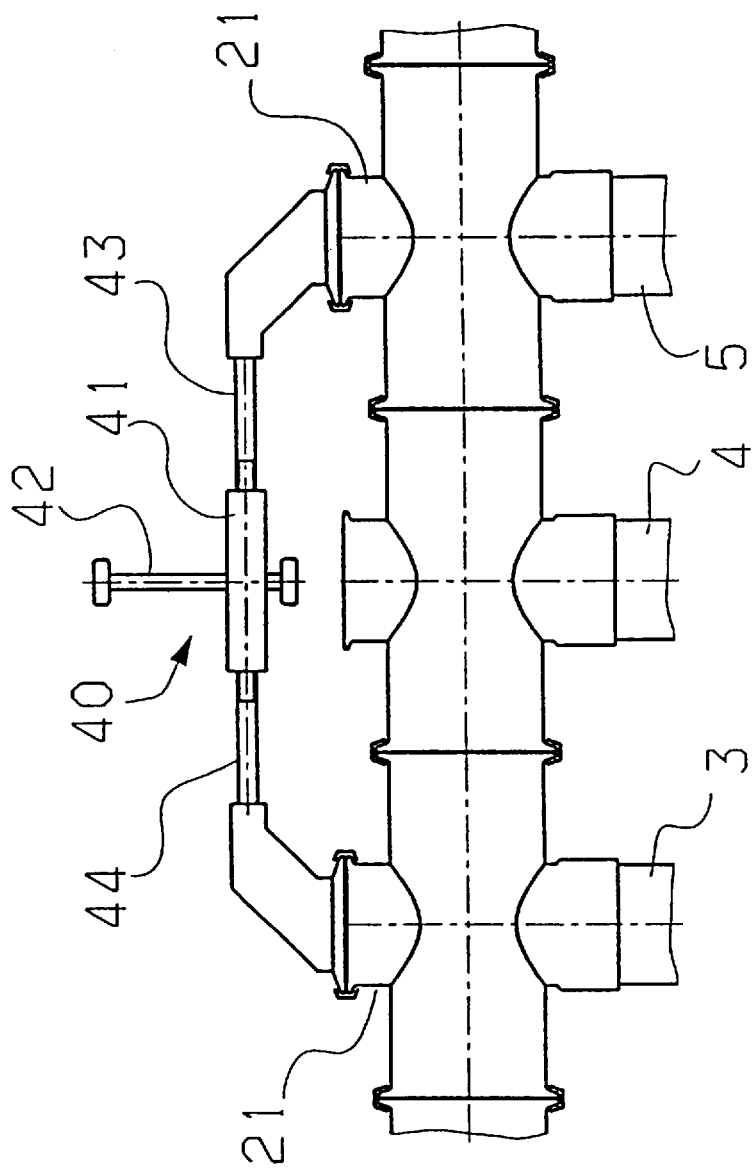

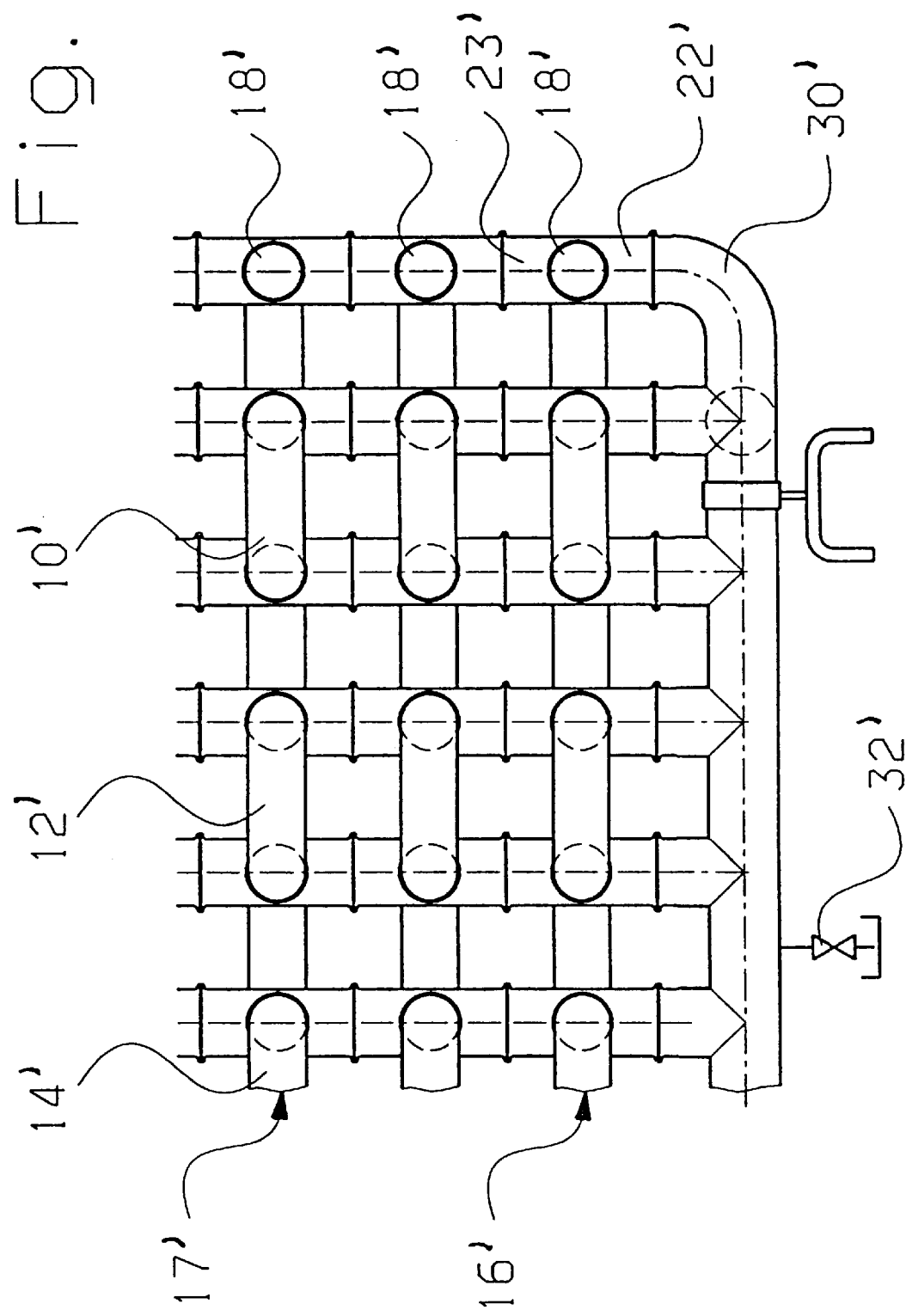

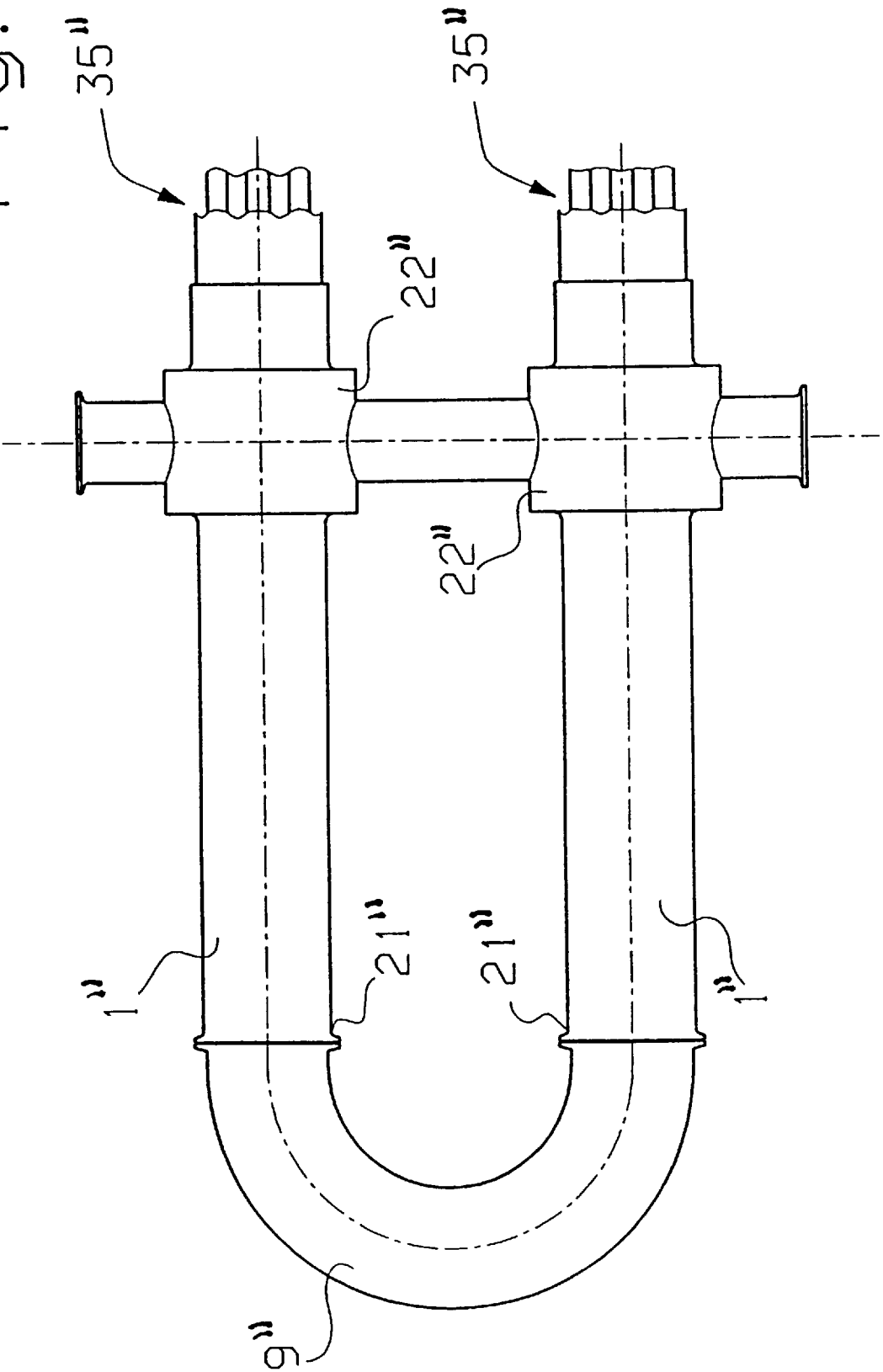

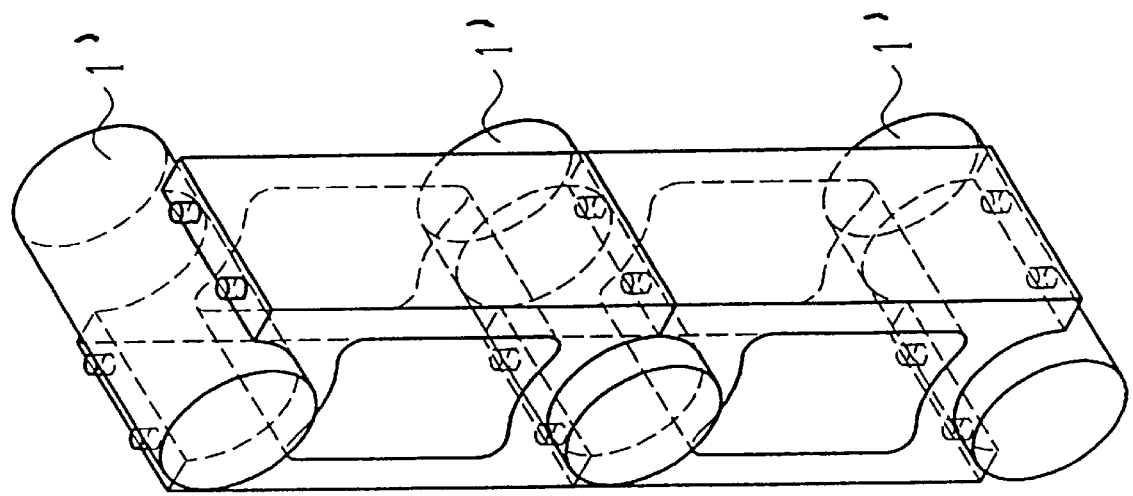
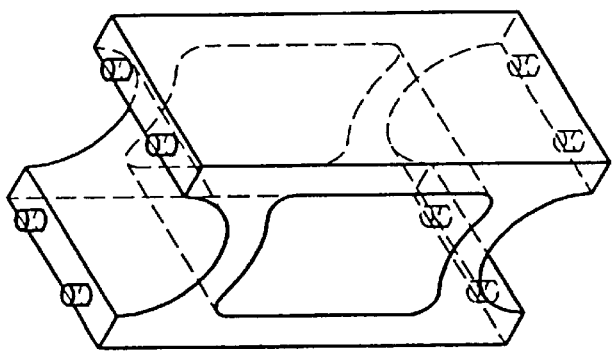
Fig. 10

SYSTEM FOR MEMBRANE FILTRATION IN A CROSS STREAM PROCESS

This application is a 371 of application PCT/CH97/00349, filed on Sep. 18, 1997.

The invention relates to a system for membrane filtration by the cross-flow process, having a number of membrane modules, each including one membrane tube or a bundle of a plurality of membrane tubes, whose walls have the function of separation membranes, and a tubular module housing for receiving the membrane tubes, delivering a medium to be filtered as a retentate and removing the filtrate in the form of permeate, wherein each membrane module has one connecting flange for delivering and removing the retentate and at least one further connecting opening for removing the permeate.

Such membrane modules as known as components of cross-flow filtration systems. Cross-flow filtration is a pressure filtration process. The product to be filtered flows at a predetermined speed crosswise to the straight-through direction and along the surface of the filter or of the filtration membrane. The crosswise flow largely prevents solids from becoming deposited on the surfaces of the filters and thereby makes long-term operation possible without plugging up of the filters.

Such membrane modules are often embodied as so-called tube or capillary modules, in which one or more capillary tubules or tubes are combined into a bundlelike unit. The separating membrane is applied to the inside wall or outside wall of the tubes, depending on the model. In one version, 19 membrane tubules with an inside diameter of one-half inch are combined into a bundle. A retentate flows at a predetermined pressure through these 19 tubules simultaneously and in parallel. After passing through the filter membranes, the permeate flows out via two connections to each membrane module.

Since the specific filtration capacity in terms of surface area of known membranes is relatively low, to achieve greater, more practical filtration capacities a number of modules are connected together both in series and parallel in one group. If the number of modules connected in series is low, then the modules are connected directly to one another longitudinally in numbers of up to four. The retentate connections are usually so solid that the group is supported via these lines. In that case, no further support elements are present. The permeate lines then have no load-bearing function.

Such arrangements are commercially practical only if membrane tubes with small diameters up to approximately 4 mm, so-called capillary tubes, are used. The membranes used are usually of ceramic and in terms of separation performance are in the field of microfiltration with separation limits of from 5 nm to 100 nm. The membrane modules then have a high proportion of membrane surface area per unit of volume of the module. However, in comparison with modules of other designs, they have disadvantages in terms of process technology; because of the small membrane tube diameters, the tubes readily become plugged up with solids.

If the number of series-connected modules is high, and up to 16 modules per series are known, then they are joined together via 180° elbows. If the group includes only five series run simultaneously in parallel, then 80 modules have to be disposed as compactly as possible in one unit. To that end, the individual modules are supported on bearing arms, and the numerous connections are made on the retentate and permeate sides. The following problems then arise:

Four pipe connections and two to three bearing points on bearing arms are needed per membrane module. In a system with approximately 200 modules, these connections and bearing points lead to high system costs and thus reduce the economy of the system.

Separating membranes have only a limited life. The membrane modules are thus parts subject to wear, and they must be replaced at certain time intervals. The expense for assembly and disassembly is enormous, because of the large number of connections.

The permeate connections in known systems are usually brought to a collective line via flexible, transparent hoses. The large number of connecting points, as well as air bubbles, are detrimental to hygienic conditions.

It is therefore the object of the invention largely to eliminate the problems addressed above.

According to the invention, this object is attained in a system of the type defined at the outset in that each membrane module has at least four further connecting elements, which are disposed laterally on the outer wall (referred to at times herein as the "jacket") of the module housing and at least two of which act as connecting openings for removing the permeate; that the membrane modules are joined together laterally, via the connecting elements located on the jacket, to form at least one group of membrane modules; and that the permeate of the membrane modules of each group is removed through the laterally joined-together membrane modules via the connecting openings located on the jacket.

An advantageous variant of this system is distinguished in that the connecting elements are embodied as connecting flanges.

The characteristic may be obtained that the lateral connections of the membrane modules retain the membrane modules in self-supporting fashion in their group via the connecting elements disposed on the jacket. A preferred embodiment of the system is characterized in that the axes of all the further connecting elements for all the membrane modules of a group are located in the same plane, and each membrane module has one first pair of connecting elements and one second pair of connecting elements, all of which are located on a first common axis and a second common axis, respectively.

Further variants of the system, a membrane module for use in this system, and a spreader tool for disassembly or assembly of such a membrane module in such a system are defined by the claims.

The system according to the invention for membrane filtration offers the following advantages over known arrangements:

Via the laterally disposed connecting flanges for removing the permeate, the membrane modules can be replaced and joined together in a modular system.

A separate permeate collective line disposed next to the membrane modules, and having many hose connection elements, is dispensed with.

The interconnected membrane modules form a self-supporting construction.

Substantial savings in terms of production costs of the system.

Connections between the membrane modules with better hygienic conditions and better opportunities for cleaning.

Exemplary embodiments of the invention are described in further detail in the ensuing description and in the drawing figures. Shown are:

FIG. 1, a system for membrane filtration according to the invention, in a frontal view;

FIG. 2, a side view of the system of FIG. 1;

FIGS. 3a, 3b, 3c, 3d, connecting flanges shown in detail, disposed on a module housing for a system of FIGS. 1 and 2;

FIG. 4, a cross section through blind support elements for connecting laterally adjacent membrane modules in a system according to the invention;

FIGS. 5a, 5b, 5c, 5d, details of a membrane module for a system of FIG. 1 and 2, which is retractable and insertable together with its connecting flanges in the system;

FIGS. 6a, 6b, 6c, details of a one-piece structural component for connecting a plurality of adjacent membrane modules in a system according to the invention;

FIG. 7, a frontal view of a spreader tool for assembling a membrane module in a group of a system of FIGS. 1 and 2;

FIG. 8, a detail, seen in side view, of an alternative arrangement of a system for membrane filtration according to the invention;

FIG. 9, connecting elements on adjacent module housings with sufficient spacing from the ends of the housings; and FIG. 10, a frontal view of a further embodiment of blind support elements for connecting membrane modules located vertically one above the other in a system according to the invention.

FIGS. 1 and 2 show a front and side view, respectively of a group of 80 membrane modules in a system for membrane filtration. In FIG. 1, eight tubular module housings 1–8 can be seen, which are mounted in wall-like fashion one above the other and in series in a group 16. The module housing 1 is connected in series to the module housing 2 via a 180° pipe elbow 9, and the same is true for the following module housings, with housing 2 connected to housing 3 via elbow 10 and so forth on through module housing 7 connected to housing 8 via elbow 15. The elbows 10, 12, 14 can also be seen in the side view of FIG. 2.

As FIG. 2 shows, along with the module housings 1-8 mounted one above the other and in series in the group 16 and connected by the elbows 9-15, nine further identical groups of module housings, the last of which is identified by reference numeral 17, are also mounted. All the groups 16–17 are acted upon with a medium to be filtered, in the form of retentate, via a collecting line 18 at their lowermost modules 1, and so forth. The retentate flows upward under pressure through the series of modules 1–8, and so forth, and is removed through a second collecting line 19 at the last modules 8, and so forth.

As shown particularly in FIG. 1, each module housing 1–8, and so forth, has one connecting flange 20, 21, etc. at each of its ends for the retentate and two connecting flanges each 22, 23, 24, 25, etc., for removing the filtrate in the form of permeate. The connecting flanges 22, 23; 24, 25; etc. for the permeate are all located on a first common axis 26 and second common axis 27, respectively, and connect the module housings 1–8, etc., for removal of the permeate. As FIGS. 1 and 2 show, the permeate is removed from the axes 26, 27, etc., of the groups 16–17, etc., via overhead collective lines 28, 29.

The downward-pointing permeate flanges of the lowermost module housings 1, etc., are joined together by two connecting lines 30, 31, which each have a drain 32 for cleaning purposes and are supported on base profiles 33, 34. The groups 16–17, etc., of module housings 1–8, etc., are accordingly supported in self-supporting fashion on the base profiles 33, 34 via the permeate flanges 22–25, etc.

FIG. 3a shows a front view of a flange 21, for the retentate, mounted on the end of a module housing 4, and two flanges 24, 25 for the permeate, which are produced in the same molded part. FIGS. 3a–3d also show a bundle 35 of membrane tubes which are disposed in the module housing 4 in a manner known per se as filtration elements. The retentate flows into the membrane tubes of the flange 21, while the permeate passes through the walls of the membrane tubes and flows out through the module housing 4 and the flanges 24, 25.

As can be seen, the flanges 24, 25 form a pipe connection for the removal of the permeate, whose inside diameter is greater than the diameter of the enveloping cylinder of the bundle 35. The permeate flow along the axes 26, 27 in FIG. 1 to the collective lines 28, 29 thus has enough space to flow past the bundle 35 of FIGS. 3a–3d. The pipe connection formed by the flange 24 has a support face 38 for the insertion of a spreader tool, not shown here. This spreader tool is inserted between the support face 38 and a corresponding support face on the pipe connection of the next membrane module but one, so that when the next membrane module located in between them is assembled, it can move freely.

As FIGS. 1 and 2 show, the tubular module housings 1–8 and the housings of the adjacent groups 16–17 are retained only on their ends by the permeate flanges 22-25, etc. FIG. 4, in a vertical section through permeate flanges 24, 25, shows blind support elements 36, which brace horizontally adjacent module housings with their membrane tube bundles 35 against one another. The support elements 36 may also advantageously be disposed offset toward the middle from the ends of the module housings 1–8, etc., relative to the permeate flanges 24, 25.

FIGS. 5a–5d show a module housing 1 which together with its connecting elements 24', 25' for the permeate can be retracted and inserted between connecting tubes 37 connected to these connecting elements. The detail A in FIG. 5d shows a snap connection 38 on the connecting tube 37, which locks the module housing 1 on its insertion between the connecting tubes 37. On the opposite end of the module housing 1, the connecting elements 24', 25' are embodied as shown in FIG. 5b, to enable the retraction and insertion here as well.

FIGS. 6a, 6b and 6c, instead of the connecting flanges 22, 23 of FIG. 1, show a one-piece tubular structural component 39 for connecting a plurality of module housings 1 and removing the permeates thereof. One such structural component 39 can replace the 16 connecting flanges along the axis 26 or 27 of FIG. 1. The detail A in FIG. 6c shows a snap connection 38 on the connecting tube 39, which in this case as well locks the module housing 1 on its insertion into the structural component 39.

FIG. 7 shows a spreader tool 40, which is braced against the connecting flanges 21 for the retentate of two module housings 3, 5, which are adjacent to a module housing 4 that is to be assembled. The spreader tool 40 includes a threaded sleeve 41, which upon manual rotation with a knob 24 moves two contrary threaded bolts 43, 44 counter to one another.

FIG. 8 shows a detail of an arrangement of a system for membrane filtration in a side view, as an alternative to the system of FIG. 2. The series-connected groups 16'–17' of membrane modules are disposed horizontally in this alternative arrangement.

The retentate inlets 18' of the groups are supplied from a collective line, not shown. The connecting flanges 22', 23', etc., for the permeate here in contrast to FIG. 1 always connect module housings of different groups 16'–17'. The delivery and removal of retentate and permeate via collective lines are as in the arrangement of FIG. 1 and FIG. 2.

The arrangement of FIG. 8 can offer advantages, in that the lateral spacings between groups 16'–17', dictated by the connecting flanges 22', 23', etc., can be closer.

FIG. 9 shows an arrangement of connecting elements 22" on adjacent module housings 1", whose spacing from the end flanges 21" of the module housings 1" for the retentate is greater than three times the diameter of one module housing 1". This arrangement offers the advantage over that of FIG. 1 that the module housings can be supported more uniformly over their entire length, and that the support function of the 180° elbow 9" for the retentate is better utilized.

FIG. 10 shows a front view of a further embodiment of blind support elements 36' for connecting membrane modules 1', located vertically one above the other, in a system according to the invention. Such support elements 36' may be present between adjacent membrane modules 1', over the entire length of these modules. In a way similar to the arrangement of FIG. 9, they serve to provide uniform stabilization of the membrane modules 1'.

What is claimed is:

1. A system for membrane filtration by the cross-flow process, having a number of membrane modules, each including one membrane tube or a bundle (35, 35") of a plurality of membrane tubes, whose walls have the function of separation membranes, and a tubular module housing (1–8, 1', 1") for receiving the membrane tubes, delivering a medium to be filtered as a retentate and removing the filtrate in the form of permeate, wherein each membrane module has one connecting flange (20, 21) for delivering and removing the retentate and at least four further connecting elements (22–25), which are disposed laterally on the module housing (1–8, 1', 1") and at least two of which act as connecting openings for removing the permeate; wherein the membrane modules are joined together laterally, via the connecting elements (22–25), to form at least one group (16, 17, 16', 17') of membrane modules; and wherein the permeate of the membrane modules of each group (16, 17, 16', 17') is removed through the laterally joined-together membrane modules via the connecting elements (22–25).

2. The system of claim 1, characterized in that the connecting elements are embodied as connecting flanges (22–25).

3. The system of claim 2, characterized in that the axes of the four further connecting flanges (22–25) disposed laterally on the module housing (1–8, 1', 1") are disposed in pairs, each in one plane, on the module housing (1–8, 1', 1").

4. The system of claim 3, characterized in that the membrane modules (1–8) of one group (16, 17) are joined together with the interposition of connecting tubes (37), via the further connecting flanges (24', 25') that are disposed in pairs with their axes each in a single plane laterally on the module housing.

5. The system of claim 4, characterized in that the membrane modules of one group, together with the further connecting flanges (24', 25') disposed with their axes in pairs each in one plane laterally on the module housing are retractable and insertable between the connecting tubes (37) without changing the position of the connecting tubes (37).

6. The system of claim 5, characterized in that the connecting tubes for the further connecting flanges of the membrane modules of one group, which connecting flanges are disposed laterally with their axes in pairs each in one plane, have support faces (38) for a spreader tool which upon disassembly or assembly of a membrane module in a group can be used to spread apart the laterally adjacent membrane modules.

7. A spreader tool (40) for removing or assembling a membrane module (4) in a group of a system for membrane filtration of claim 5, characterized in that the spreader tool (40) is suitable for being braced against the connecting flanges (21) for delivering or removing the retentate of the membrane modules (3, 5) of one group which are adjacent to the membrane module (4) to be assembled.

8. A spreader tool for removing or assembling a membrane module in a group of a system for membrane filtration of one of claim 4, characterized in that the spreader tool is suitable for being braced on the connecting tubes (24, 25) for the further connecting flanges of the membrane modules of a group that are adjacent to the membrane module to be assembled, which connecting flanges are disposed with their axes in pairs each located crosswise in one plane.

9. The system of claim 2, characterized in that the connecting flanges (21) of the membrane modules for delivering and removing the retentate are disposed on the ends of the module housings (4) and with their axes parallel to the axes of the module housings, and that one connecting flange (21) each for the retentate and two connecting flanges (24, 25) located crosswise to it for removing the permeate are each produced in one common molded part.

10. The system of claim 1, characterized in that the membrane modules are retained in self-supporting fashion in their group via the connecting elements (22–25).

11. The system of claim 10, characterized in that the self-supporting construction of the groups of membrane modules is stabilized between adjacent membrane modules by blind support elements (36, 36') between the connecting elements disposed laterally on the module housings.

12. The system of claim 1, characterized in that the axes of all the further connecting elements (22–25) for all the membrane modules of a group (16, 17) are located in the same plane, and each membrane module has one first pair (22, 23) of connecting elements and one second pair (24, 25) of connecting elements, all of which are located on a first common axis (27) and a second common axis (26), respectively.

13. The system of claim 12 characterized in that the connecting elements are connecting flanges and in that the inside diameter of the pipe connections formed for removing the permeate by the connecting flanges (24, 25) disposed laterally on the module housing and joined together is greater than the diameter of the enveloping cylinder of the bundles (35) of membrane tubes that are located in the membrane module.

14. The system of claim 12, characterized in that the connecting elements, disposed laterally on the module housings (1) and corresponding to one another, of at least two adjacent membrane modules are joined together by a one-piece structural component (39), in which the membrane modules are retained in insertable fashion.

15. The system of claim 1, characterized in that the tubular module housings (1–8, 1', 1") of the membrane modules, between the laterally disposed connecting elements (22–25), are reinforced with means for stabilizing their shape.

16. The system of claim 1, characterized in that the centers of the connecting elements (22") disposed laterally on the module housing (1") are disposed on the module housing at a spacing from the next closest connecting flange (21") for the retentate that is greater than three times the diameter of the tubular module housing (1").

17. A module (1–8) for a system for membrane filtration of claim 1, characterized in that it has one connecting flange (20, 21) each for delivering and removing the retentate, as well as at least four further connecting elements (22–25), which are disposed laterally on the module housing (4) and of which at least two act as connecting openings for removing the permeate.

18. A system for membrane filtration by the cross-flow process, said system comprising a number of membrane modules; each of said membrane modules including a plurality of membrane tubes whose walls function as separation membranes, and a tubular module housing for receiving the membrane tubes, delivering a medium to be filtered as a retentate and removing the filtrate in the form of permeate; each of said membrane modules being provided with connecting flanges at its ends for delivering and removing the retentate and with at least four additional connecting elements disposed laterally on the module housing so that at least two of said connecting elements act as connecting openings for removing the permeate; said membrane modules being joined together laterally via said additional connecting elements to form at least one group of membrane modules wherein the permeate of the membrane modules of the group is removed through the laterally joined-together membrane modules via said connecting elements.

19. The system of claim 18, wherein the axes of all of said additional connecting elements for all the membrane modules of a group are located in the same plane, and each membrane module has a first pair of connecting elements located on a first common axis and a second pair of connecting elements located on a second common axis.

* * * * *